United States Patent [19]

Bergling

[11] 3,946,933

[45] Mar. 30, 1976

[54] PLANT FOR APPLYING AND WELDING REINFORCING ELEMENTS ONTO A METAL PLATE

[75] Inventor: Charles Gunnar Birger Bergling, Kungalv, Sweden

[73] Assignee: ESAB-Hebe AB, Hallsberg, Sweden

[22] Filed: Mar. 11, 1974

[21] Appl. No.: 450,191

[30] Foreign Application Priority Data

Mar. 14, 1973 Sweden ............................ 7303588

[52] U.S. Cl. ............ 228/212; 29/200 P; 219/125 R; 228/4.1; 228/5.1; 228/25; 228/44.1 R; 228/45
[51] Int. Cl.² ................... B23K 37/02; B23K 37/04
[58] Field of Search ............. 228/4, 25, 44, 45, 212; 219/124, 125, 130; 29/200 J, 200 P

[56] References Cited
UNITED STATES PATENTS

| | | | |
|---|---|---|---|
| 2,983,807 | 5/1961 | Schultz et al. | 219/125 R |
| 3,511,964 | 5/1970 | Polyakov et al. | 219/124 |

FOREIGN PATENTS OR APPLICATIONS

1,049,262   11/1966   United Kingdom ............. 219/125 R

Primary Examiner—Francis S. Husar
Assistant Examiner—Gus T. Hampilos
Attorney, Agent, or Firm—Toren, McGeady and Stanger

[57] ABSTRACT

A plant for applying and welding stiffeners onto a plate is disclosed. The plant includes a welding station, a buffer station and a carriage movable between the buffer station and the welding station, the carriage being suspended in a cantilever beam extending over said stations. The carriage collects stiffeners in the buffer station and transports said stiffeners onto the plate in the welding station, means being provided to press said stiffeners to be welded against the plate. Welding means are arranged at one end of the carriage, the welding process taking place while the carriage returns to the buffer station to collect new stiffeners.

16 Claims, 10 Drawing Figures

PLANT FOR APPLYING AND WELDING REINFORCING ELEMENTS ONTO A METAL PLATE

The present invention relates to a plant for applying and welding elongate reinforcing elements onto a metal plate, said plant being of the type comprising a welding station in which the plate is carried substantially horizontally, a buffer station for reinforcing elements located adjacent to the welding station, a carriage displaceable from the buffer station in over the plate in the welding station to place reinforcing elements collected in the buffer station on to the plate, a cantilever beam or gantry extending over the welding station being used to move the carriage in over the plate in the welding station, means for pressing each reinforcing element placed on the plate by the carriage against the plate during the welding process, and welding means arranged to be displaced along the reinforcing elements thus secured in order to weld them to the plate. The plant according to the invention is particularly suitable for welding so-called stiffeners onto ship plates.

Known plants of this type for welding stiffeners onto ship plates have a number of limitations. Thus, for example, only one stiffener can be welded at a time and the time needed for each working cycle cannot be decreased below a certain limit since the welding equipment must be out of the way before the carriage used can apply a stiffener in the welding station and, conversely, the carriage must be run out of the welding station before welding can be performed.

The object of the present invention is therefore to provide a plant of the type mentioned in the introduction, in which the limitations mentioned above are easily eliminated and which also gives a number of other advantages. This is achieved by giving the plant according to the invention the features defined in the accompanying claims.

Thus, the plant according to the invention is essentially characterized in that said welding means are located at one end of the carriage so that they are displaced along the stiffeners pressed to the plate when the carriage is returned to the buffer station from the welding station after having delivered the stiffeners in the welding station. Consequently, the welding of the stiffeners to the plate takes place at the same time as the carriage returns to the buffer station to collect the next set of stiffeners to be welded on.

The buffer station is preferably designed in such a way that when the carriage starts returning from the welding station to the buffer station, the new set of stiffeners is brought into such a position that the stiffeners are taken up by the carriage directlly during its return movement. The buffer station is suitably provided with a floor transporter which is movable perpendicularly to the longitudinal direction of the stiffeners between two end positions and which can receive a set of stiffeners at each end. When the floor transporter is in one end position, therefore, the first set of stiffeners is in position to be collected directly by the carriage, while the other set is being placed on the transporter. When the floor transporter moves to its other end position, the situation is reversed, i.e. the second set of stiffeners comes into position to be collected by the carriage, at the same time as a new first set is placed on the transporter.

Thus, when the return movement of the carriage and, accordingly, the welding of the set of stiffeners already in the welding station are completed, the carriage is also provided with a new set of stiffeners and need only wait for the plate to be fed forward or indexed a suitable distance in a direction perpendicular to the parallel stiffeners before it can start feeding in the new set of stiffeners to the welding station. The feeding rate of the carriage is preferably considerably higher than its return speed which is limited by the highest permissible welding speed.

The cantilever beam or gantry included in the equipment, which preferably extends over both the welding station and the buffer station, suitably comprises two separated parallel beams, the carriage being displaceably suspended between said beams. The carriage can then easily be varied in width depending on the number of stiffeners to be applied and welded simultaneously onto the plate in the welding station.

In order to carry the stiffeners the carriage is provided with a number of rows of gripping devices corresponding to the number of stiffeners. Said rows can be displaceable laterally. The gripping devices preferably consist of pairs of gripping arms operated by jacks, at least some of which have gripping ends consisting of rollers and some of which may have gripping ends in the form of gripping jaws. Whereas the latter gripping arms are designed to be entirely relieved of pressure when the carriage is to return to the buffer station from the welding station, the former are preferably arranged to be relieved of pressure during the return of the carriage to such an extent that when they are in the welding station their rollers can roll along the associated stiffener but at the same time endeavour to hold the stiffeners straight in the longitudinal direction during the welding process and that when they are in the buffer station their rollers can receive a new stiffener between them. The gripping devices can include magnetic means.

The gripping devices are suitably arranged to grip the stiffeners at various levels, some towards the bottom and some towards the top, to ensure that the stiffeners maintain the correct angle with respect to the plate and that the best straightening effect is obtained.

The gripping device(s) in each row which are nearest the associated welding means are preferably arranged during the welding process to hold and thus to straighten the associated stiffener by means of rollers considerably more firmly than the other gripping devices of the row in question.

Said pressing means are preferably arranged in rows on the carriage and are provided with pressure-transmitting roller surfaces. The pressing means, which are brought into action when the carriage has placed a set of stiffeners in the welding station, are arranged to be relieved of pressure before they leave the welding station during the return movement of the carriage, i.e. before they leave the stiffener they have been pressing against the plate. The pressing means may be laterally displaceable in rows.

The pressing means of each row located nearest to the welding means are preferably arranged to press the associated stiffener considerably more firmly against the plate than the rest of the pressing means of the row. This provides better contact and flattening out at the welding point.

The roller surfaces of said pressing means may act directly on the top sides of the stiffeners, particularly if the stiffeners are T-shaped, or they may act via an insert having a roller track on the side facing said pressing means and which gives pressure equalization on the other side facing the stiffeners.

The welding station comprises a number of anvils or supports corresponding to the number of stiffeners to be welded during each cycle of the carriage, against which the plate is pressed by the stiffeners when they are under pressure. The anvils preferably have a longitudinally slightly concave contact surface. Since the bottom side of the stiffeners has a tendency to become concave due to welding stresses, the concave contact surface of the anvils counteracts this effect, i.e. after cooling the welded stiffeners will not have any permanent curvature.

Each anvil preferably comprises a number of mutually independent sections, each section being individually adjustable in vertical direction. The sections are arranged to be forced by pressure from below up towards the plate above, which will therefore make extremely good contact with the stiffener being pressed down onto the plate top side, regardless of whether the plate or the stiffener have unevennesses.

The features mentioned above, as well as others, and the resultant advantages of the plant according to the invention will be revealed in the following description of embodiments given by way of example with reference to the accompanying drawings, in which;

FIG. 4, in general, shows on an enlarged scale a preferred construction of the anvils in the welding station.

FIG. 5, in general, shows an example of a floor transporter for use in the buffer station of the plant.

Figure 1:
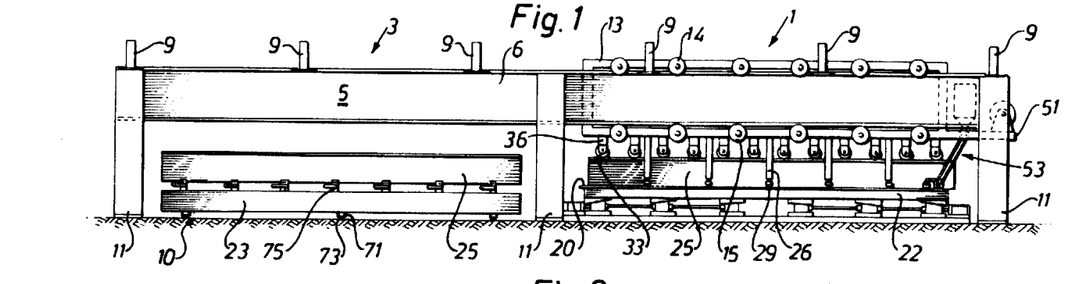
FIG. 1 shows a side view of a plant constructed in accordance with the present invention, in which the carriage is in the welding station.
Figure 2:
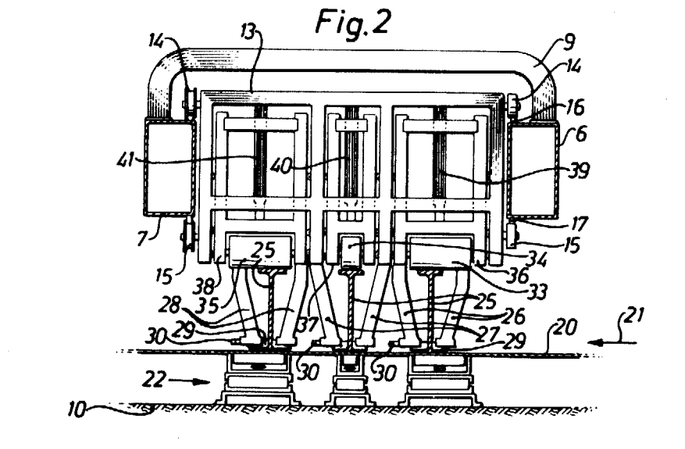
FIG. 2 shows an enlarged, schematically cross section through the welding station and the carriage being therein according to FIG. 1.

The plant according to FIGS. 1 and 2 comprises a welding station 1 and a buffer station 3. A cantilever beam 5 extends over over both the welding station and the buffer station and comprises two parallel box beams 6 and 7, joined on the upper side by yokes 9 and held up by gantry legs 11 fixed on the floor 10. Between them the beams 6 and 7 carry a displaceable carriage provided with upper wheels 14 and lower wheels 15 running along rails 16 and 17, respectively, on the upper and lower sides of the beams.

The welding station 1 is arranged to receive a plate 20 which is fed into the welding station perpendicular to the plane of the paper in FIG. 1, i.e. the direction of the arrow 21 in FIG. 2, on suitably arranged conventional feeding and carrying rollers, not shown. The plate 20 rests on a number of anvils 22 in the welding station.

The carriage 13 is arranged in the buffer station 3 to collect T-shaped plate reinforcing elements 25 from a floor transporter 23 and to transfer said elements to the welding station 1. For this purpose the carriage is provided with three parallel rows of gripping arm pairs 26, 27 and 28, each of which can hold a stiffener 25. The gripping ends of the arms consist of rollers 29, the rollers in each pair of gripping arms being displaceable with respect to each other so that they can grip the web of a stiffener 25, by at least one of the rollers being displaceable by means of a jack 30. In order to permit adjustment to varying distances between the three stiffeners 25, the two outer rows of gripping arm pairs 26 and 28 are displaceable in the carriage 13 perpendicularly to the longitudinal direction of the carriage by means of jacks, not shown.

When the stiffeners 25 have been placed in the welding station 1, they must be pressed against the plate 20 above the anvils 22 during the welding process. For this purpose the carriage 13 is provided with three rows of pressure rollers 33, 34 and 35, which cooperate with the upper sides of the stiffeners 25. The pressure rollers are separately journalled in cradles 36, 37 and 38, respectively, which are roller-guided and vertically displaceable by means of jacks 39, 40 and 41, respectively. In order to permit variation of the spacing between the stiffeners 25, the rollers 33 and 35 in the two outer rows of rollers are considerably wider than the rollers 34 in the middle row.

Figure 3:
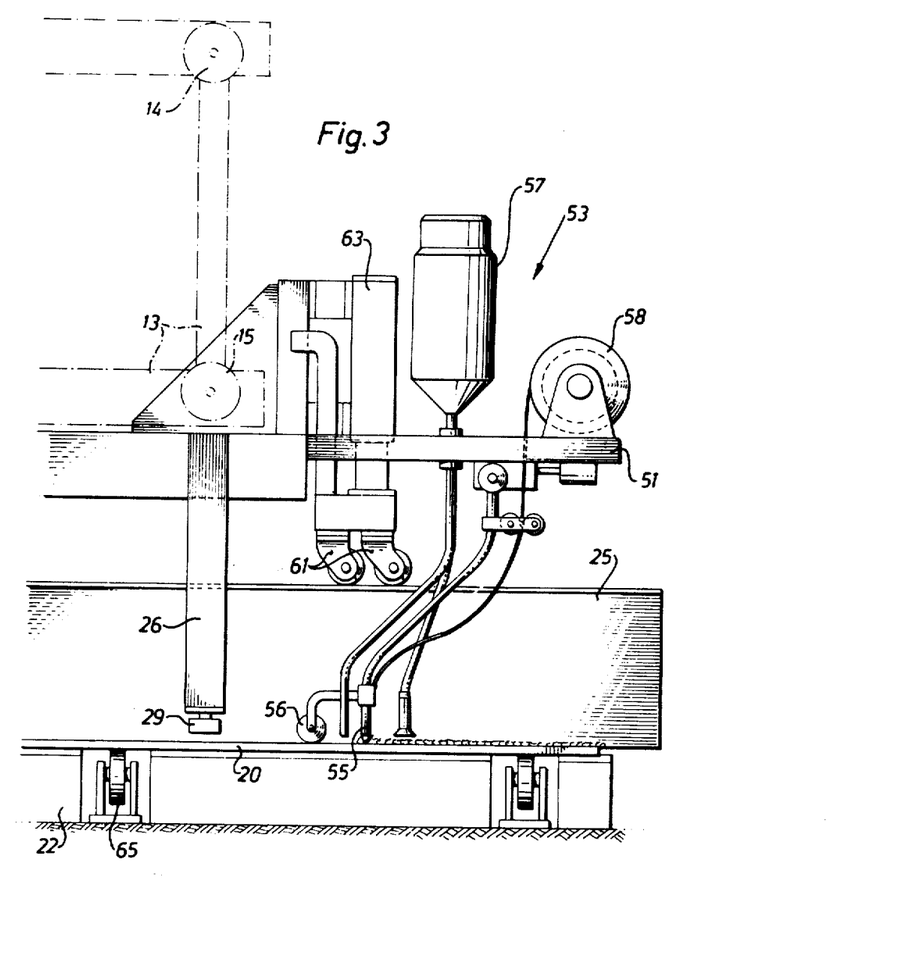
FIG. 3 shows also on an enlarged scale, the welding equipment applied on a modified carriage end.

The welding carriage 13 is provided at one end with a platform 51 carrying the welding equipment 53 which is conventional and is shown in more detail in FIG. 3.

Thus, FIG. 3 shows a conventional welding equipment 53 mounted on a platform 51 on an arrangement according to the invention which is somewhat modified with respect to FIGS. 1 and 2, but where corresponding means of FIGS. 1 and 3 have been given the same reference numerals. The welding apparatus, which is arranged to weld simultaneously and in the same manner on both sides of each stiffener 25, primarily comprises welding nozzles 55 with guide wheels 56, welding powder supplies 57 and welding wire reels 58, all of which are extremely easily accessible for inspection and maintenance.

Adjacent the welding point the modified carriage 13 according to FIG. 3 for each stiffener 25 is provided with two pressure rollers 61 arranged in a bogie, which by means of a jack 63 can be pressed considerably more firmly against the stiffener 25 than the other pressure rollers cooperating with the stiffener.

FIG. 3 also shows a pair of the rollers 65 on which the plate 20 is fed in a direction perpendicular to the stiffeners 25 after each set of stiffeners has been welded on.

Figure 5A:
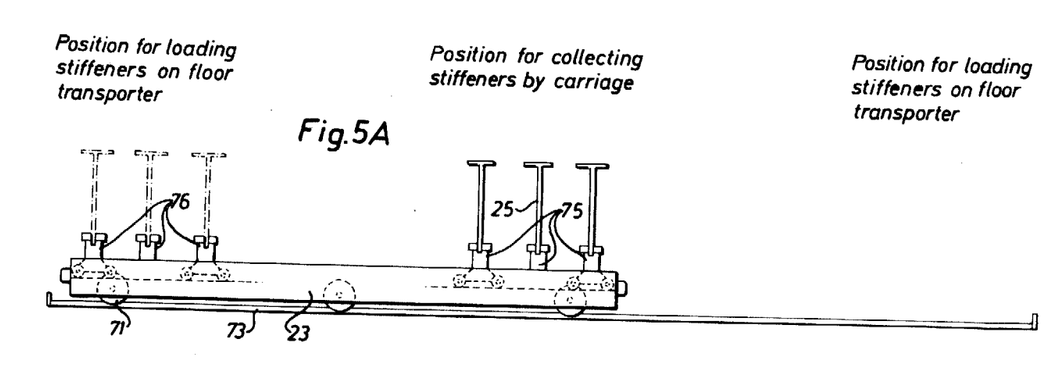
FIG. 5A shows the floor transporter in its lefthand position.
Figure 5B:
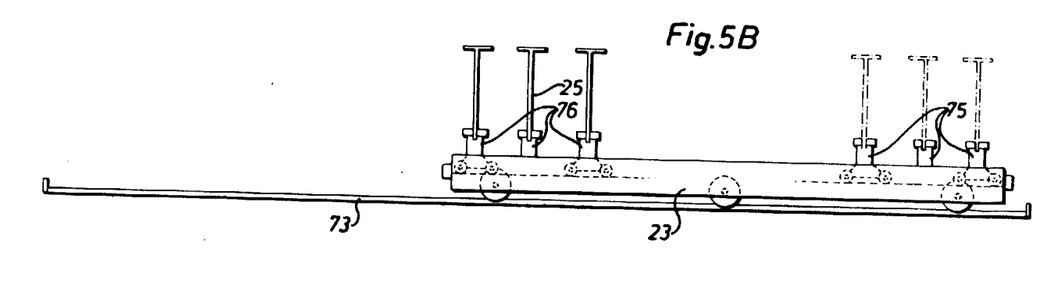
FIG. 5B shows the floor transporter in its righthand position.

As mentioned, the carriage 13 collects the stiffeners 25 from a floor transporter 23 arranged in the buffer station 3, see FIGS. 1 and 5. The floor transporter can be moved by means of wheels 71 cooperating with rails 73, in a direction perpendicular to the direction of travel of the carriage 13, between two end positions (FIG. 5A and FIG. 5B respectively). The transporter 23 is provided at each end with three rows of holders 75 and 76, respectively, for stiffeners 25. The holders, which can be folded away when they are not holding a stiffener 25, are spaced with the same spacings as required between the stiffeners on the plate 20 and thus with the same spacings as between the rows of gripping arm pairs on the carriage 13. The distances between the rows of holders can be adjusted since the holders in the two outer rows in each group are displaceable in the floor transporter 23. The holders hold the stiffeners at such a level that after being gripped by the gripping rollers 29 of the carriage 13 they can pass straight in over the plate 20 without being lifted.

When the floor transporter 23 is in its lefthand end position, FIG. 5A, the stiffeners 25 held by the holders 75 are in position to be collected directly by the carriage 13 when this returns to the buffer station 3 from the welding station, i.e. the stiffeners pass between the gripping rollers 29 of associated gripping arm pairs. At the same time the holders 76 are in position to receive new stiffeners (indicated by broken lines) from a first chain conveyor, not shown.

When the floor transporter 23 is in its righthand end position, FIG. 5B, the stiffeners received by the holders 76 while the transporter was in its lefthand position are in position to be collected directly by the carriage 13, as described above. At the same time the empty holders 75 are in position to receive new stiffeners (indicated by broken lines) from a second chain conveyor, not shown either.

The welding station 1 comprises three anvils 22, see FIG. 2, or in other words, one anvil for each of the stiffeners 25 which are simultaneously pressed against the plate 20. The anvils, which are located directly below each stiffener, are of the same width as the pressure rollers 33, 34 and 35, respectively, with which they cooperate. The two outer anvils are therefore considerably wider than the one in the middle, thus enabling stiffeners to be pressed on with differing spacing without complicated conversion operations having to be performed.

Figure 4A:
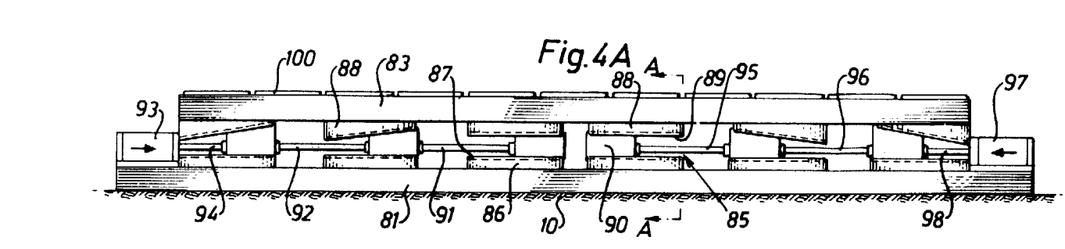
FIG. 4A shows a side view of an anvil set to give a straight anvil surface.
Figure 4B:
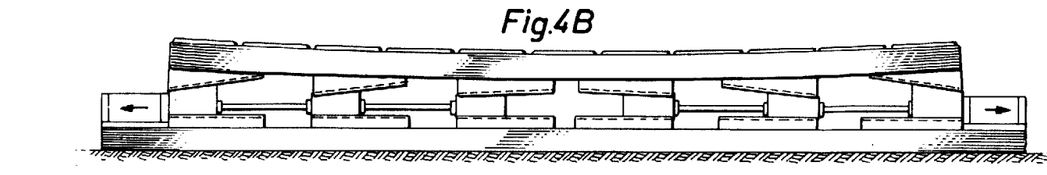
FIG. 4B shows the anvil according to FIG. 4A set to give a curved anvil surface and FIG. 4C shows an enlarged cross section through the anvil according to FIG. 4A.
Figure 4C:
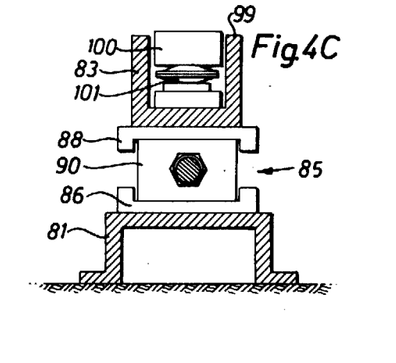

Although the construction of the anvils 22 is substantially evident from FIGS. 1 and 2, the preferred construction will be described in connection with FIG. 4, FIG. 4A showing a side view of an anvil set to give a straight anvil surface, FIG. 4B showing the anvil according to FIG. 4A set to give a curved anvil surface and FIG. 4C showing an enlarged cross section through the anvil according to FIG. 4A.

The anvil according to FIG. 4 comprises a base plate 81 secured on the base 10, a flexible U-beam or profile 83 resting on said base plate via a number of wedge connections 85. Each wedge connection comprises a plate 86 secured to the base plate 81 and having a horizontal sliding surface 87, a plate 88 secured to the lower side of the U-beam and having a more or less inclined sliding surface 89, and a wedge element 90 movable between the sliding surfaces 87 and 89, the sliding surfaces of the wedge element 90 fitting the sliding surfaces 87 and 89. The wedge elements 90 are arranged to be displaced together, half the wedge elements being connected to each other by rods 91 and 92 and connected to a jack 93 located on one side of the anvil by a rod 94 and half the wedge elements being connected to each other by rods 95 and 96 and connected to a jack 97 located on the other side of the anvil by a rod 98.

Assuming that the inclination of the cooperating wedge surfaces of the various wedge connections have been adjusted to fit each other, it is consequently possible to continuously vary the curvature of the U-beam 83 due to continuous action of the jacks 93 and 97 and thus of the wedge elements 90. The anvil surface 99 of the U-beam 83 can therefore be given a predetermined suitable curvature.

Inside the U-beam 83 a number of anvil sections are arranged, said sections being independent of each other. Each anvil section rests on a pressure box 101 which can be pressurized, for example using air, in order to press the associated anvil section 100 up against a plate applied on the anvil. The plate is generally pressed at the same time against the anvil surface 99 of the U-beam by the stiffener acting above the anvil, i.e. the anvil section 100 is unable to lift the plate and the stiffener pressing thereon from the surface 99. If, however, due to some unevenness for example, there is a space between the plate and the stiffener above, the anvil section 100 will lift the plate from the surface 99 and press it tightly against the stiffener. It is to be understood that fluid pressure control means in the form of conventional control valves (not shown) may be provided in order to vary the fluid control pressure in the jacks 30, 39, 40, 41, 63, 93 and 97, as well as in the pressure box 101. Such control valves may be of the hydraulic pressure control type and since such valves are well known in the art and may be readily provided by anyone having ordinary skill in the art, they are not shown and described in detail.

Furthermore, it is to be understood that the indexing mechanism (not shown) whereby the plate 20 is indexed in directions perpendicular to the direction of travel of the carriage 13 is conventional and forms no part of the present invention. Such indexing mechanisms are readily available and are within the knowledge of anyone having ordinary skill in the art. Accordingly, further description thereof is considered unnecessary for a complete understanding of the present invention.

The function of the plant according to the invention will now be described broadly starting from the situation shown in FIGS. 1 and 2, i.e. with the carriage 13 entirely in the welding station and with the stiffeners 25 pressed against the plate 20. In this situation the floor transporter is in the position shown in FIG. 5A.

When the carriage 13 starts its return movement to the buffer station 3 the welding process of the stiffeners 25 onto the plate 20 is also started. During its return movement the carriage is driven by conventional driving machinery, not shown, mainly via the lower wheels 15 which are pressed against the rails 17 due to the reaction forces from the jacks 39–41. As the carriage returns, pressure is removed from the pressure rollers 33–35 and the gripping rollers 29, which leave the stiffeners 25, i.e. the pressure rollers are lifted so that they can pass over the new stiffeners in the holders 75 on the floor transporter, and the gripping rollers 29 are separated so that the new stiffeners can pass between the associated gripping rollers. As the gripping rollers 29 approach the holders 75, the holders are relieved of pressure and those parts which might interfere with the gripping arms of the carriage are folded away. When the welding equipment 53 reaches the ends of the stiffeners facing the buffer station, welding is interrupted. The carriage 13 continues, however, an additional distance into the buffer station so that the welding equipment will be free from the welded stiffeners and so that the new stiffeners are completely inside the carriage. In this position the gripping rollers are brought into engagement and the carriage reverses.

During the return of the carriage to the buffer station, new stiffeners have been placed in the lefthand holders 76 of the floor transporter 23 by means of the lefthand chain conveyor, not shown.

Furthermore, the plate 20 has been fed forwards in a direction perpendicular to the direction of movement of the carriage a distance equal to three times the distance between the stiffeners, while the welding equipment was outside the welding station as the carriage reached its end position in the buffer station and reversed.

Thus, when the new stiffeners have been gripped by the gripping rollers 29, the carriage starts to move back to the welding station. Its speed is now considerably greater and it is driven by means of the upper wheels 14. When the carriage has completely left the buffer station the floor transporter 23 is transferred to the position shown in FIG. 5B in which the holders 76 now carry new stiffeners to be collected directly and the holders 75 start to receive new stiffeners from the righthand chain conveyor, not shown.

Immediately after this the carriage 13 will have reached its end position in the welding station. The carriage then stops, the gripping rollers 20 are relieved from pressure, at least to a certain extent, and the pressure rollers 33–35 are lowered and press the stiffeners 25 down against the plate 20. Assuming that the floor transporter 23 has had time to reach the position shown in FIG. 5B, the carriage can not start a new return movement to the buffer station, i.e. one working cycle has been completed.

During each working cycle signals are obtained for pressure unloading, pressure loading, holder folding, start, stop, and so on, by means of limit position transducers actuated by the carriage and the floor transporter.

Figure 6:
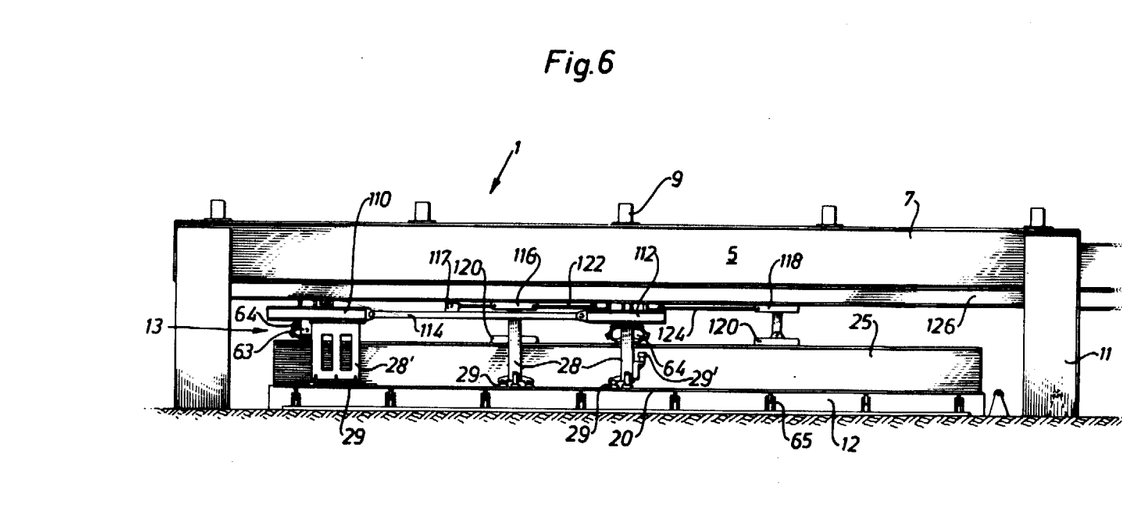
FIG. 6 shows a side view of the welding station and the carriage therein of another plant constructed in accordance with the present invention, the welding equipment being omitted for the sake of clarity.
Figure 7:
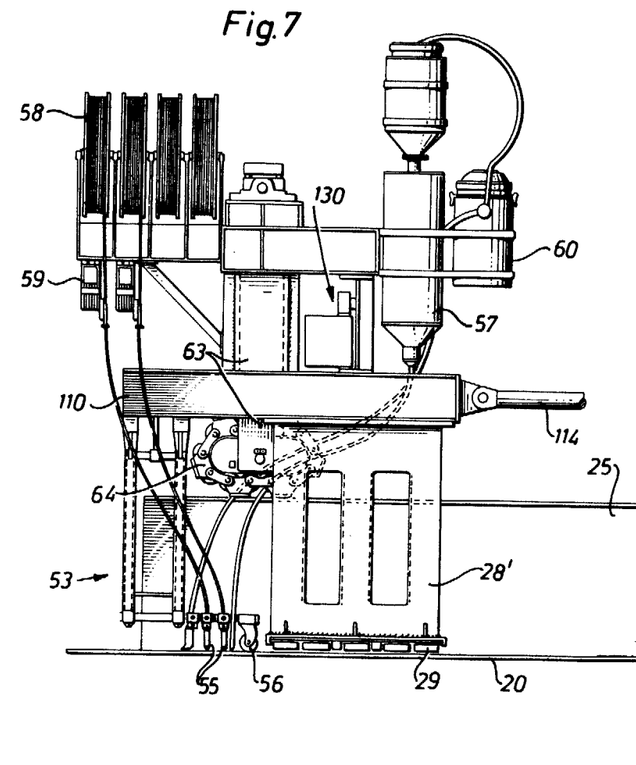
FIG. 7 shows on an enlarged scale the end of the carriage in FIG. 6 with the welding equipment applied.

FIGS. 6 and 7 show the welding station and the carriage 13 of a modified plant in accordance with the invention, in which means corresponding to those of the plant according to FIGS. 1–5 have been given the same reference numerals as have said latter means.

In this design the carriage 13 includes two main carriage parts. A first part 110 carries for each of the stiffeners to be welded simultaneously by welding equipment, a pressing means including a pressing jack 63 and a conventional plate chain feeder 64, and a pair of reinforced gripping arms 28' being longitudinally extended and having five rollers 29 on each side of the stiffener 25, which gives an excellent straightening effect. A second part 112 also carries for each stiffener a plate chain feeder 64 with associated pressing jack (not shown) and a pair of gripping arms 28 having rollers 29, 29', one roller 29' on each side of the stiffener being located considerably higher than the rest of the rollers. Said main parts 110 and 112 are coupled to each other by means of a connecting rod 114 being replaceable or longitudinally adjustable and having such a length that in the starting position shown the main part 112 is situated approximately above the centre of the stiffener 25.

Furthermore, the carriage 13 includes two carriage parts 116 and 118, each of which carries a vertically movable lifting magnet 120 for each stiffener, said carriage part 116 also carrying a pair of gripping arms 28 with rollers 29 for each stiffener. The carriage part 116 is coupled to a screw 122, one end of which is coupled to the main carriage part 112 and the other end of which is coupled to said connecting bar 114 at 117, whereby the position of said carriage part 116 relative to the main carriage part 112 is adjustable. In a similar manner the position of the carriage part 118 relative to the main carriage part 112 is adjustable by means of a screw 124. Said carriage parts 110, 112, 116 and 118 are provided with wheels (not shown) running on the insides of longitudinally extending beams 126 which are fixed to the cantilever beam 5.

The lifting magnets 120 are arranged to be lowered and activated to hold the associated stiffener 25 when the carriage 13 is in the buffer station (not shown) to collect stiffeners. The lifting magnets, which consequently assist and supplement the gripping devices 28, 28' and prevent any slipping thereof, are deactivated and raised, when the carriage 13 has fed the stiffener into the welding station, after which the welding process can be started.

FIG. 7 shows how the welding equipment suitably is arranged on the main carriage part 110. The welding equipment comprises essentially the same means as those already described with reference to FIG. 3 and additionally, motors 59 for electrode feeding. Moreover, the powder and dust extractor 60 is arranged to recover the extracted unconsumed powder and to return said powder to the welding powder supply 57. As indicated at 130 the welding equipment 53, the pressing means 63, 64 and the gripping means 28', 29 are displaceable perpendicularly to the longitudinal direction of the stiffeners to enable adjustment to the spacings desired between the stiffeners to be welded simultaneously.

In a plant according to the invention and constructed in accordance with FIGS. 6 and 7, advantageously, also the main carriage part 112 can be provided with welding equipment. Suitably this is accomplished by making the main carriage part 112 identical to the main carriage part 110 as regards welding equipment, pressing means and gripping means. This means that the welding time is reduced by one half and the speed of the carriage can be increased already when the carriage has halfway passed the stiffeners in the welding station.

Furthermore, it is possible to drive the various carriage parts separately but synchronously, which means that the relative positions of the carriage parts can be easily adjusted by selectively driving the carriage parts before the plant is brought into normal operation.

Of course, the invention is not limited to the embodiments described but various modifications and changes are possible within the scope of the invention.

What is claimed is:

1. A method for welding elongate reinforcing elements to a metal plate comprising the steps of holding said metal plate to lie in a substantially horizontal plane at a welding station, positioning at least one reinforcing element at a buffer station generally located adjacent said welding station, reciprocally moving a carriage along a generally linear path between said welding station and said buffer station, said carriage having mounted thereon welding means and means for releasably gripping said reinforcing elements, moving said carriage from said buffer station to said welding station to transport to said welding station into welding positions reinforcing elements gripped by said gripping means of said carriage at said buffer station, pressing against said plate and simultaneously welding to said plate the reinforcing elements positioned at said welding station by operation of said welding means while moving said carriage from said welding station to said buffer station and simultaneously causing said gripping means to engage reinforcing elements positioned at said buffer station, and returning said carriage to said welding station to move thereto into welding position subsequent reinforcing elements to be welded.

2. A method according to claim 1 wherein said carriage is moved at a faster speed from said buffer station to said welding station than vice versa.

3. Apparatus for applying and welding elongate reinforcing elements onto metal plates, said apparatus comprising a welding station in which the plate is held in a substantially horizontal position, a buffer station for reinforcing elements located adjacent said welding station, a carriage movable from said buffer station in over said plate in said welding station to place at least one reinforcing element collected in said buffer station onto said plate, a cantilever beam extending over said buffer station and said welding station, said carriage being movable in over the plate in the welding station while carried by said cantilever beam, means for pressing against said plate during the welding process each element placed on said plate by said carriage, and welding means arranged to be displaced along the elements thus pressed to said plate in order to simultaneously weld said element to said plate, said welding means being located at one end of said carriage so that they are displaced along the elements pressed to said plate when said carriage is returned to the buffer station from said welding station.

4. Apparatus according to claim 3 wherein said buffer station includes means for bringing said reinforcing elements into position to be taken up by said carriage when said carriage returns to said buffer station from said welding station while simultaneously welding said elements delivered to said welding station.

5. A plant according to claim 3, wherein said cantilever beam comprises two separated, parallel beams between which the carriage can be moved.

6. A plant according to claim 5, wherein said cantilever beam extends over the buffer station, the carriage being movably suspended in the cantilever beam.

7. A plant according to claim 3, wherein said pressing means are arranged on the carriage, the surfaces of the pressing means coming into contact with a reinforcing element comprising roller surfaces and the pressing means being arranged, when the carriage returns to the buffer station to be relieved of pressure before they leave the welding station.

8. A plant according to claim 3, wherein the welding station comprises a number of anvils corresponding to the number of reinforcing elements to be welded during each return movement of the carriage, said anvils being arranged under the plate below the associated element and comprising a number of sections, independent of each other, which are vertically adjustable.

9. A plant according to claim 8 wherein said anvils have a concave contact surface for the plate.

10. A plant according to claim 8, further comprising means for pressing each anvil section up towards the plate.

11. Welding apparatus for attaching elongate reinforcing elements onto a metal plate comprising means defining a welding station including means for supporting said plate at said welding station to lie in a substantially horizontal plane, means defining a buffer station located adjacent said welding station, a cantilever beam extending over both of said welding station and said buffer station, a movable carriage having mounted thereon welding means for welding said reinforcing elements to said plate and means for releasably gripping said reinforcing elements, means mounting said carriage upon said beam for reciprocal motion along a generally linear path between said welding station and said buffer station, means for positioning said reinforcing elements in said buffer station with said elements extending longitudinally in a direction generally parallel to the direction of said linear path of said carriage means, and means on said carriage for pressing against said plate in a welding position reinforcing elements held by said gripping means when said movable carriage is moved to said welding station, said gripping means being arranged on said carriage to engage said reinforcing elements positioned in said buffer station when said carriage is moved from said welding station to said buffer station and to transport said elements into welding position relative to said plate when said carriage is moved from said buffer station to said welding station, said welding means being arranged on said carriage to weld to said plate reinforcing elements held in said welding position by said pressing means while said carriage is moving from said welding station toward said buffer station to bring said gripping means into gripping engagement with other reinforcing elements positioned in said buffer station.

12. Apparatus according to claim 11 wherein said positioning means include transport means for bringing reinforcing elements into said buffer station when said carriage is at said welding station, said transport means operating to move said reinforcing ribs into said buffer station through a path extending in a direction generally perpendicular to said linear path of said carriage means and to position said ribs for engagement by said gripping means of the carriage.

13. Apparatus according to claim 12 wherein said transport means are arranged to be reciprocally moved perpendicularly across said linear path of said carriage, said transport means including a pair of reinforcing element mounting means spaced apart perpendicularly of said carriage travel path, said reciprocal motion of said transport means enabling reinforcing elements to be placed upon said mounting means while said carriage is in said buffer station with movement of said transport means perpendicularly of the path of said carriage when said carriage is moved to said welding station enabling introduction of said previously mounted reinforcing elements into said buffer station, with reciprocal movement of said transport means across said buffer station enabling continuous mounting of reinforcing elements thereon and movement of said reinforcing elements into said buffer station.

14. A plant according to claim 11, wherein said gripping means on said carriage is provided with at least one row of gripping arms arranged in pairs parallel to the direction of transport, each row of gripping arm pairs being intended to carry one reinforcing element when the carriage is moved from the buffer station to the welding station.

15. A plant according to claim 14, wherein at least some of the pairs of gripping arms having gripping ends including rollers, said gripping arms being arranged, during the return movement of the carriage from the welding station to the buffer station, to be relieved of pressure so that when the gripping arms are in the welding station their rollers can roll on the associated element but also endeavour to keep the element straight during the welding process and so that when the gripping arms are in the buffer station they can receive a new element between them.

16. A plant according to claim 11, wherein said carriage is provided with additional welding means for each element to be welded simultaneously located substantially at the centre of the carriage, so that said welding means located at one end of the carriage and said additional welding means will weld substantially one half each of each reinforcing element to be welded.

* * * * *